P. PFLEIDERER.
Device for Transmitting and Reversing Motion.
No. 212,738. Patented Feb. 25, 1879.
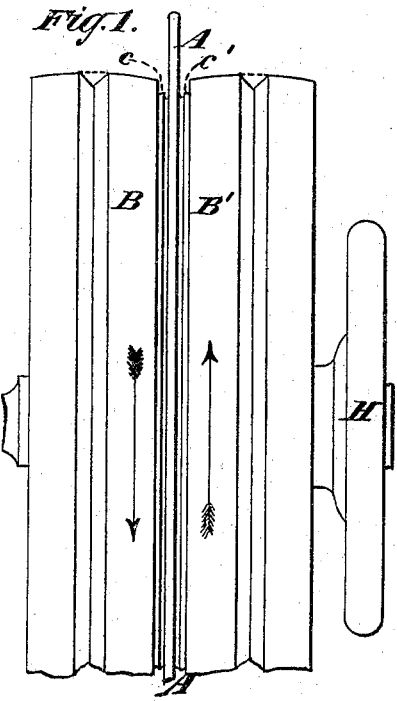
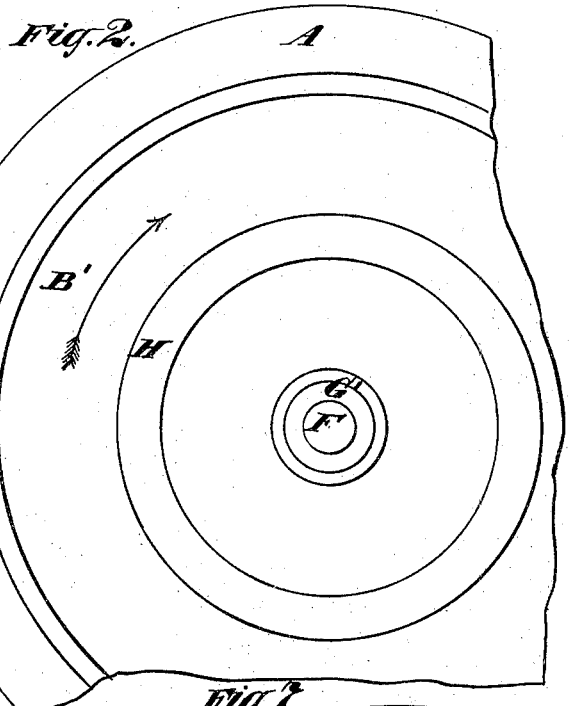
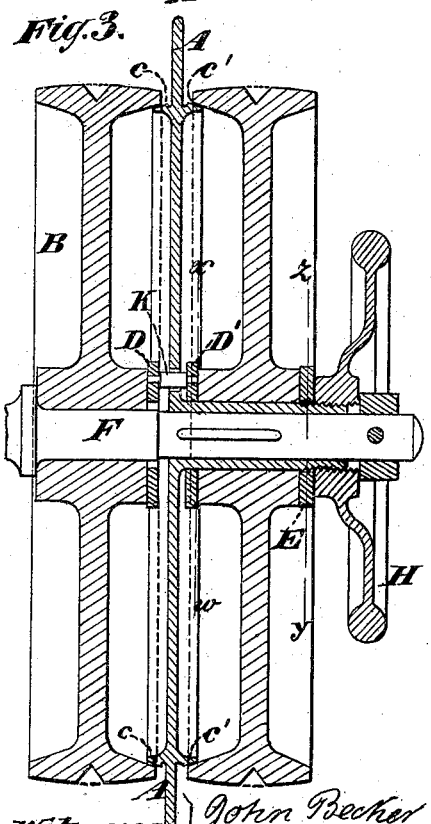
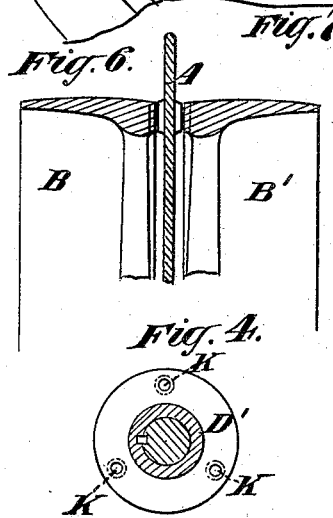
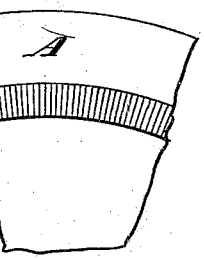
Witnesses
John Becker
Fred. Haynes
Inventor
Paul Pfleiderer
by his Attorneys
Brown & Brown

UNITED STATES PATENT OFFICE.

PAUL PFLEIDERER, OF NORWOOD, ENGLAND.

IMPROVEMENT IN DEVICES FOR TRANSMITTING AND REVERSING MOTION.

Specification forming part of Letters Patent No. 212,738, dated February 25, 1879; application filed December 20, 1878.

*To all whom it may concern:*

Be it known that I, PAUL PFLEIDERER, of Norwood, Surrey county, England, have invented Improvements in Apparatus for Transmitting and Reversing Motion, of which the following is a specification:

My invention consists in the combination of two loose pulleys on one shaft, one pulley being driven by an open strap, and the other by a crossed strap, with friction or other clutches, by moving which clutches as required either of the said two loose pulleys can be made fast and motion transmitted or reversed with facility and certainty.

The clutches consist of projections, one on each side of a disk secured on the shaft between the two pulleys, so as to be capable of sliding on the shaft, each of which projections can, by the moving of the disk on the shaft, be caused to enter and be embraced by corresponding parts in either pulley, as required.

The disk is moved on the shaft, as required, by means of a tapped hand-wheel, which also keeps the disk in any required position thereon. In cases wherein the apparatus is fitted to the driving-shaft of a machine, or otherwise, in an accessible position, the machine can thereby be stopped and reversed by hand. For stopping the machine, the said hand-wheel has simply to be held fast, while for starting the same it has to be turned in the direction in which the machine is to be worked.

From the foregoing statement it will be clearly understood that the invention consists, essentially, of two loose pulleys with an open and a crossed strap, combined with friction or other clutches, which latter are moved into and out of gear with either pulley, as required, in order to fix it on the shaft and release it, such clutches being moved, as required, by working the hand-wheel.

The invention further consists of a pair of rings or washers so connected by distance-pieces, and so arranged on the disk between the two pulleys, that the latter are always kept at a certain distance from each other, and so that they cannot stick in the clutches and follow the lateral movements of the disk.

Referring to the drawings, Figure 1 represents a portion of the apparatus in elevation. Fig. 2 is a partial side view, and Fig. 3 a section, of the same. Fig. 4 is a transverse section in the line $w\,x$, and Fig. 5 is a similar section in the line $y\,z$, of Fig. 3, with the pulley removed. Figs. 6 and 7 show, in partial section, an application of the invention to another kind of clutches, as distinguished from friction-clutches.

A is a disk, capable of being moved laterally on the shaft F by means of the hand-wheel H, Figs. 1, 2, and 3, which acts as a nut on the screwed boss of the disk A.

On the drawings, the clutches $c$ and $c'$ are shown as cast in one with the disk A, and by moving the disk as required either the clutch $c$ can be put in contact with the pulley B, or the clutch $c'$ with the pulley B$'$, by screwing the hand-wheel outward or inward, respectively.

In Figs. 3, 4, and 5, E is a washer, placed between the pulley B$'$ and the hand-wheel H, to prevent any movement of the latter by the friction of the pulley against it. G G$'$ are collars to keep the whole apparatus in position. D D$'$ are two washers, which are connected by three distance-pieces, K K, passing loosely through corresponding holes in the disk A.

By this arrangement the two pulleys B B$'$ are prevented from moving laterally and following the disk when thrown out of contact. In some existing single friction-clutches this is done by a spring.

When the disk A is moved by a tapped wheel with right-handed screw, the straps or driving-bands should be put on in such a manner that the pulleys are caused to revolve in directions as indicated by the arrows, so that by merely holding fast the hand-wheel H the machine can at any time be stopped, while it can be started by turning that wheel in the direction in which the machine is required to work.

I claim—

1. The combination of the disk A, with double clutches $c$ and $c'$, with the hand-wheel H, the washers D and D$'$, with distance-pieces K K, and the washer on the shaft F, so as to form with the two loose pulleys B and B$'$ an apparatus for conveniently reversing and stopping rotary motion, substantially as described.

2. The combination of a disk, A, with one clutch, c', with the hand-wheel H and the washers D and D', with distance-pieces K K, and the washer E, so as to form with a loose pulley, B', an apparatus for conveniently imparting motion to the shaft F and stopping the same, substantially as described.

PAUL PFLEIDERER.

Witnesses:
JOHN VENN,
WILLIAM SPENCE.